(12) United States Patent
Hughes

(10) Patent No.: US 7,796,733 B2
(45) Date of Patent: Sep. 14, 2010

(54) PERSONNEL SECURITY SCREENING SYSTEM WITH ENHANCED PRIVACY

(75) Inventor: Ronald J. Hughes, Garden Grove, CA (US)

(73) Assignee: Rapiscan Systems, Inc., Torrance, CA (US)

( * ) Notice: Subject to any disclaimer, the term of this patent is extended or adjusted under 35 U.S.C. 154(b) by 209 days.

(21) Appl. No.: 12/024,320

(22) Filed: Feb. 1, 2008

(65) Prior Publication Data

US 2008/0212742 A1  Sep. 4, 2008

Related U.S. Application Data

(60) Provisional application No. 60/887,798, filed on Feb. 1, 2007.

(51) Int. Cl.
*G01N 23/203* (2006.01)
(52) U.S. Cl. .................. 378/87; 378/57; 378/98.12
(58) Field of Classification Search .............. 378/57, 378/87, 98.12
See application file for complete search history.

(56) References Cited

U.S. PATENT DOCUMENTS

| | | | |
|---|---|---|---|
| RE28,544 E | 9/1975 | Stein et al. | |
| 4,366,382 A | 12/1982 | Kotowski | |
| 4,799,247 A | 1/1989 | Annis et al. | |
| 4,839,913 A | 6/1989 | Annis et al. | |
| 4,841,555 A * | 6/1989 | Doi et al. ................... | 378/98.4 |
| 4,864,142 A | 9/1989 | Gomberg | |
| 4,894,619 A | 1/1990 | Leinonen et al. | |
| 4,974,247 A | 11/1990 | Friddell | |
| 5,022,062 A | 6/1991 | Annis | |
| 5,121,105 A | 6/1992 | Aittoneimi | |
| 5,181,234 A | 1/1993 | Smith | |
| 5,247,561 A | 9/1993 | Kotowski | |
| 5,892,840 A * | 4/1999 | Jang et al. ................... | 382/132 |
| 6,094,472 A * | 7/2000 | Smith .......................... | 378/86 |
| 6,301,327 B1 | 10/2001 | Martens et al. | |
| 6,552,346 B2 | 4/2003 | Verbinski et al. | |
| 6,665,373 B1 * | 12/2003 | Kotowski et al. .............. | 378/90 |
| 6,721,391 B2 | 4/2004 | McClelland et al. | |
| 6,785,360 B1 * | 8/2004 | Annis .......................... | 378/137 |
| 6,965,340 B1 | 11/2005 | Baharav et al. | |
| 6,967,612 B1 | 11/2005 | Gorman et al. | |
| 7,110,493 B1 | 9/2006 | Kotowski et al. | |
| 7,185,206 B2 | 2/2007 | Goldstein | |
| 2003/0012338 A1* | 1/2003 | Lienard et al. ........... | 378/98.12 |
| 2004/0088584 A1 | 5/2004 | Shachar et al. | |
| 2004/0109532 A1 | 6/2004 | Ford et al. | |

(Continued)

OTHER PUBLICATIONS

International Search Report for PCT/US2008/067619, Rapiscan Security Products.

(Continued)

*Primary Examiner*—Edward J Glick
*Assistant Examiner*—Thomas R Artman
(74) *Attorney, Agent, or Firm*—Patentmetrix

(57) ABSTRACT

The present invention is directed towards processing security images of people subjected to X-ray radiation. The present invention processes a generated image by dividing the generated image into at least two regions or mask images, separately processing the at least two regions of the image, and viewing the resultant processed region images either alone or as a combined image.

17 Claims, 9 Drawing Sheets

U.S. PATENT DOCUMENTS

2004/0175018 A1* 9/2004 MacArthur et al. ......... 382/103
2006/0262902 A1* 11/2006 Wattenburg .................. 378/57
2007/0172026 A1 7/2007 Schlomka
2007/0235652 A1* 10/2007 Smith .................... 250/363.02

OTHER PUBLICATIONS

International Search Report for PCT/US2008/088345, Rapiscan Security Products.

* cited by examiner

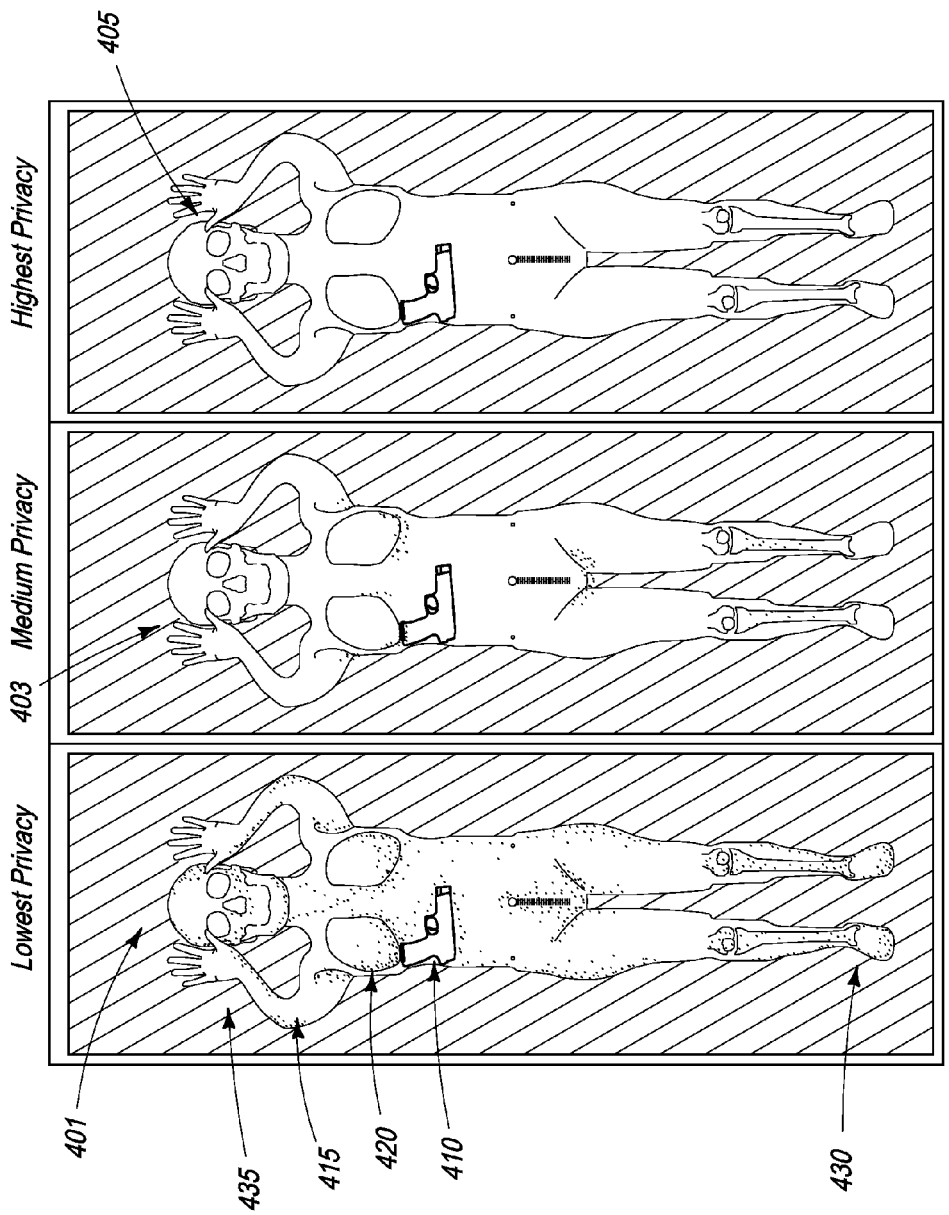

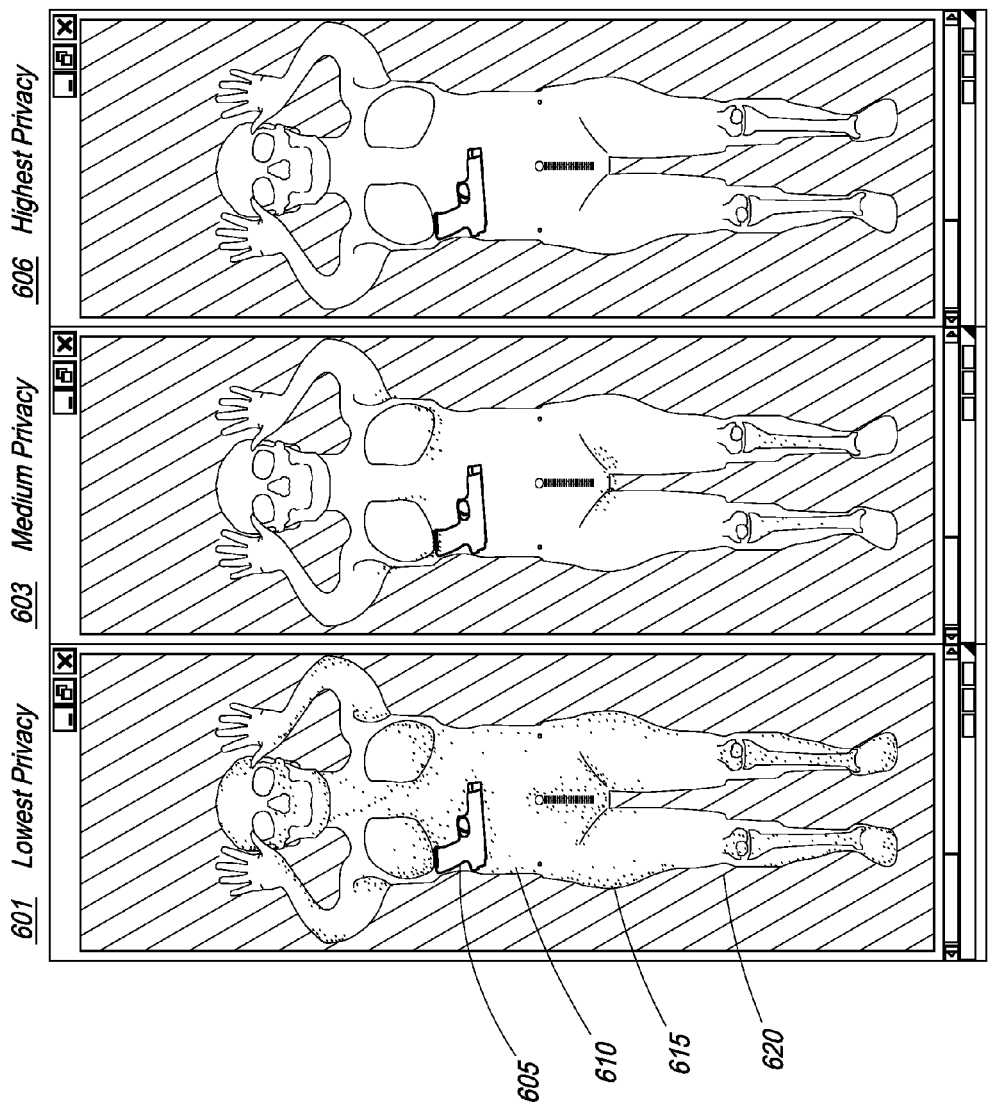

PERSONNEL SECURITY SCREENING SYSTEM WITH ENHANCED PRIVACY

CROSS-REFERENCE TO PRIORITY APPLICATION

The present applications relies on for priority U.S. Provisional Patent Application No. 60/887,798 filed on Feb. 1, 2007.

FIELD OF THE INVENTION

The present invention relates generally to the field of image processing. In particular, the present invention relates to image processing techniques that employ maximum threat detection performance and minimal information loss. More particularly, the present invention relates to the field of radiant energy imaging systems and methods and more specifically to image processing techniques for detecting concealed objects carried on the body or clothing of a person without compromising the privacy of the person.

BACKGROUND OF THE INVENTION

Images of objects comprising various types of materials can be generated using X-ray scattering. The intensity of scattered X-rays is related to the atomic number of the material scattering the X-rays. In general, for atomic numbers less then 25, the intensity of X-ray backscatter, or X-ray reflectance, decreases as the atomic number increases. Objects are potentially visible in X-ray images of human subjects due to the difference in X-ray reflectance between the objects and human tissue. Thus, conventionally, images are primarily modulated by variations in the atomic number of the subject's body.

Non-metallic objects are commonly composed of low atomic number elements similar to those of human tissue, i.e. hydrogen, carbon, nitrogen, and oxygen. Soft human tissue scatters a significant amount of X-rays due to the relatively low atomic number of hydrogen, carbon, and oxygen in relatively high concentration. Due to the high atomic number of calcium, bones near the surface of the body, comprised mainly of calcium, produce much less scatter. Concealed objects, especially metals, can be easily visualized in the images due to their significant difference in atomic composition from the background of human tissue.

In conventional systems, especially of the X-ray transmission type, an operator is required to identify very low contrast objects in the presence of inherent image clutter that results from the imaging of internal human anatomy. The difficulty of this task results in poor detection capability for a wide range of dangerous objects composed of low atomic number elements, such as plastics or ceramics, which are often masked by the low atomic number elements which comprise the human body.

Radiation exposure limit is also an important consideration in X-ray concealed object detection systems. Various prior art X-ray systems for detecting objects concealed on persons have limitations in their design and method that prohibit them from achieving low radiation doses, or prevent the generation of high image quality, which are prerequisites for commercial acceptance. An inspection system that operates at a low level of radiation exposure is limited in its precision by the small amount of radiation that can be directed towards a person being screened.

X-ray absorption and scattering further reduces the amount of X-rays available to form an image of the person and any concealed objects. In prior art systems, this low number of detected X-rays has resulted in unacceptably poor image quality.

As shown in FIG. 1a, conventional systems that employ low-radiation techniques for generating images of individuals 101 do so without suppressing sensitive anatomical features 105, thereby allowing for the visual display of personal anatomical details 105 and invading the privacy of people being screened. Also, in existing systems, detailed images are produced by characteristics of the subject's body and any object concealed under the subject's clothing. The system operator then inspects each image for evidence of concealed objects. The equipment operator and security personnel responsible for analyzing conventional images are thus privy to these personal anatomical details.

In addition, current systems that are used to enhance or improve upon levels of privacy in resultant X-ray images of humans use basic brightness, contrast adjustment and subsequent manipulation to wash out body contours and detail or highlight metallic or inorganic objects. Thus, threat items 125b tend to appear as a darker contrast than the body 135b, as shown in FIG. 1b. For example, FIG. 1b illustrates different X-ray images generated from brightness and contrast manipulations at low 110b, medium 115b, and high privacy 120b settings, respectively. While this prior art method is effective in screening for inorganic threat items (i.e. metal objects) 125b, details of organic threat items (i.e. explosives or contraband) are lost in the image processing.

Further, conventional systems tend to employ complicated image processing methods on the entire image, such as the use of edge algorithms, smoothing filters or even object recognition. While these methods work well for inorganic threat items at a high privacy level and even offer reasonable results for organic objects at low privacy settings, they remove essential information that could be displayed without decreasing privacy levels. For example, FIG. 1c illustrates a series of X-ray images generated from complicated image processing methods, at low 110c, medium 115c, and high privacy 120c settings, respectively. Note that, at higher privacy levels, while the general outline of the body 135c and metal object 125c still appear, details around the feet 145c and fingers 150c begin to disappear.

It should be noted herein that conventional image processing techniques for protecting privacy, as shown and described in FIGS. 1a, 1b, and 1c above, tend to diminish non-body images as well, and thus, degrade the image presented to the viewer. For example, but not limited to such example, employing a traditional combination of increased brightness and contrast to diminish anatomical features may also result in the washing out of smaller and thin threat objects, such as plastic explosives, because they have properties similar to human skin. Further, another traditional processing technique employs blurring of anatomical detail, which also results in the reduced threat detection.

Additionally, objects that are located "off-body" are difficult to image, given the darker background of air or a conventional screening back-drop. When a filter is applied to the resultant images, using conventional image processing methods, almost all objects that are at the person's side or located inside of loose clothing tend to disappear.

Still further, more advanced methods include using edge detection algorithms, which effectively enhance and apply a threshold calculation for adjacent pixels. If the contrast between adjacent pixels is great enough, then the deviation will be displayed. Most body parts, however, protrude in such a way that deems the edge partial, and appearing on only the bottom half of the object. It is possible to use a filtering algorithm to suppress objects with a partial low edge. However, this may result in the inadvertent omission of threat detection, because the threat could be imaged in such a way that only a partial edge is detected and thus the threat is filtered out.

Still further, previous techniques have been employed that sequentially apply processing techniques to images. These techniques use threshold values for pixel brightness or contrast to make objects easier to distinguish or filter them out entirely.

Still further, some scanning systems employ techniques of artificial intelligence to recognize body parts, such as but not limited to shoulders, head, feet, and identify them in the image. The computer system can then use triangulation techniques to roughly calculate and estimate where the common private parts are and blur these regions, or filter only those areas. Still further, correlation algorithms can be used that compares known shapes of objects, such as a gun or human anatomy, and enhance or filter them, respectively. For example, if a gun is detected, a correlation algorithm can be used to associate the imaged shape with a gun and subsequently enhance the image.

As detailed above, prior art systems fail to display only the suspect region(s) in detail while suppressing anatomical details or other features of the human body that are not required for analysis. Thus, the prior art does not provide a system that achieves the correct balance between the conflicting, yet equally important principles of maximizing security and inspection capability while retaining a sufficient level of privacy for the person under inspection.

What is therefore needed is a processing technique that allows for different regions of an original image to be processed separately so that different portions of the image can be optimized to desired object detection or privacy levels.

What is also needed therefore is an image processing technique that allows for maximum threat detection performance with minimum display of anatomical details.

What is also needed is an X-ray inspection system that takes advantage of image processing techniques to allow for maximum threat detection performance with minimum display of anatomical details.

What is also needed, therefore, is an X-ray inspection system for detecting concealed objects carried by a person, capable of detecting low atomic number ("low-Z") materials as well as metals, but which does not expose the subject to radiation doses significantly higher than normal environmental radiation levels.

SUMMARY OF THE INVENTION

The present invention is directed towards image processing techniques that advantageously process a generated image by dividing the generated image into at least two regions or mask images, separately processing the at least two regions of the image, and viewing the resultant processed region images either alone or as a combined image. In one embodiment, the present invention is directed towards the use of a "mask image" or "stencil", a processed version of the at least one region of the original image, as a means for separating the original image into regions of interest. In another embodiment, the mask image is a high contrast image generated from the original image. In another embodiment, the original image is subject to a threshold calculation to arrive at a mask image.

In yet another embodiment, the original image is processed to form at least two different images, each of which contains a different region of interest. In one embodiment, the at least two different images further comprises a first image or "mask" that results from identifying and separating out at least a first region of the original image and a second image or "mask" that results from identifying and separating out at least a second region of the original image.

In one embodiment, the identification and separation of at least a region of the original image is achieved based on at least one intensity threshold. Thus, the different regions of information contained within the original image are defined by whether the intensity value of that particular region of the image is above, below, or equal to the threshold value. In another embodiment, the threshold value is selected so that it divides regions of information into two categories—lesser scatter and greater scatter. Lesser scatter, in one embodiment, corresponds to scatter from a background barrier or from a high-atomic number object that exhibits reduced scatter. Greater scatter, in one embodiment, may correspond to scatter from a person's body, clothing, or other low-atomic number objects.

In another embodiment, the at least two different mask images are processed separately to create at least two corresponding processed region images. In one embodiment, the processed region images comprise images that contain different levels of detail derived from regions of information on the original image. Embodiments of the present invention are also directed towards image processing techniques that allow for effective detection of both organic and inorganic objects/items located both on a human subject and "off body" with considerations for desired levels of privacy and/or optimized levels of detection per region of interest.

In another embodiment, the present invention is directed to a method for generating and processing an image comprising the steps of subjecting a person to an X-ray source, detecting X-ray radiation, such as backscattered radiation, generating an original image from the detected X-ray radiation, identifying at least two regions in the original image, wherein at least one of said images comprises a region of detected radiation scattered from a portion of said person, creating at least a first region image and a second region image from the at least two regions of information, and individually processing the at least first image and a second image to create a first processed region image and a second processed region image. Optionally, the at least first processed region image and second processed region image are combined to create a combined image. Optionally, the original image generated is that of said person combined with a background. Optionally, the first region image is representative of the person without said background. Optionally, the at least two regions are identified and the at least a first region image and a second region image are created by applying a calculated threshold. Optionally, the at least two regions are identified and the at least first region image and second region image are created by applying an empirical determination derived from a library of knowledge.

Optionally, the at least two regions are identified and the at least first region image and second region image are created by employing object recognition techniques. Optionally, the first region image is processed to create a first processed region image that maintains object of interest information and reduced anatomical detail of the person. Optionally, the first processed region image is a representation of at least a region of the original image that is processed using intensity-based image contrasting. Optionally, the first processed region image is a representation of at least a region of the original image that is processed using edge detection algorithms. Optionally, the second region image is representative of all off-body areas of the original image. Optionally, the image processing method is employed to detect concealed contraband, dangerous objects, or any other object of interest.

BRIEF DESCRIPTION OF THE DRAWINGS

These and other features and advantages of the present invention will be appreciated, as they become better understood by reference to the following detailed description when considered in connection with the accompanying drawings, wherein:

FIGS. 4a, 4b, and 4c are illustrations of processed X-ray images at low, medium, and high settings, respectively, according to one embodiment of the processing methods of the present invention;

FIGS. 6a, 6b, and 6c are illustrations of processed X-ray images at low, medium, and high settings, respectively, according to another embodiment of the processing methods of the present invention, as used in a security screening system.

DETAILED DESCRIPTION OF THE INVENTION

The present invention is directed towards image processing techniques that advantageously process a generated image by dividing the generated image into at least two regions, separately processing the at least two regions of the image, and viewing the resultant processed region images either alone or as a combined image. The present invention is also directed towards image processing techniques that allow for different regions of an original image to be processed separately so that different portions of the image can be optimized to desired object detection or privacy levels.

The present invention is directed toward multiple embodiments. Language used in this specification should not be interpreted as a general disavowal of any one specific embodiment or used to limit the claims beyond the meaning of the terms used therein.

Figure 2A:
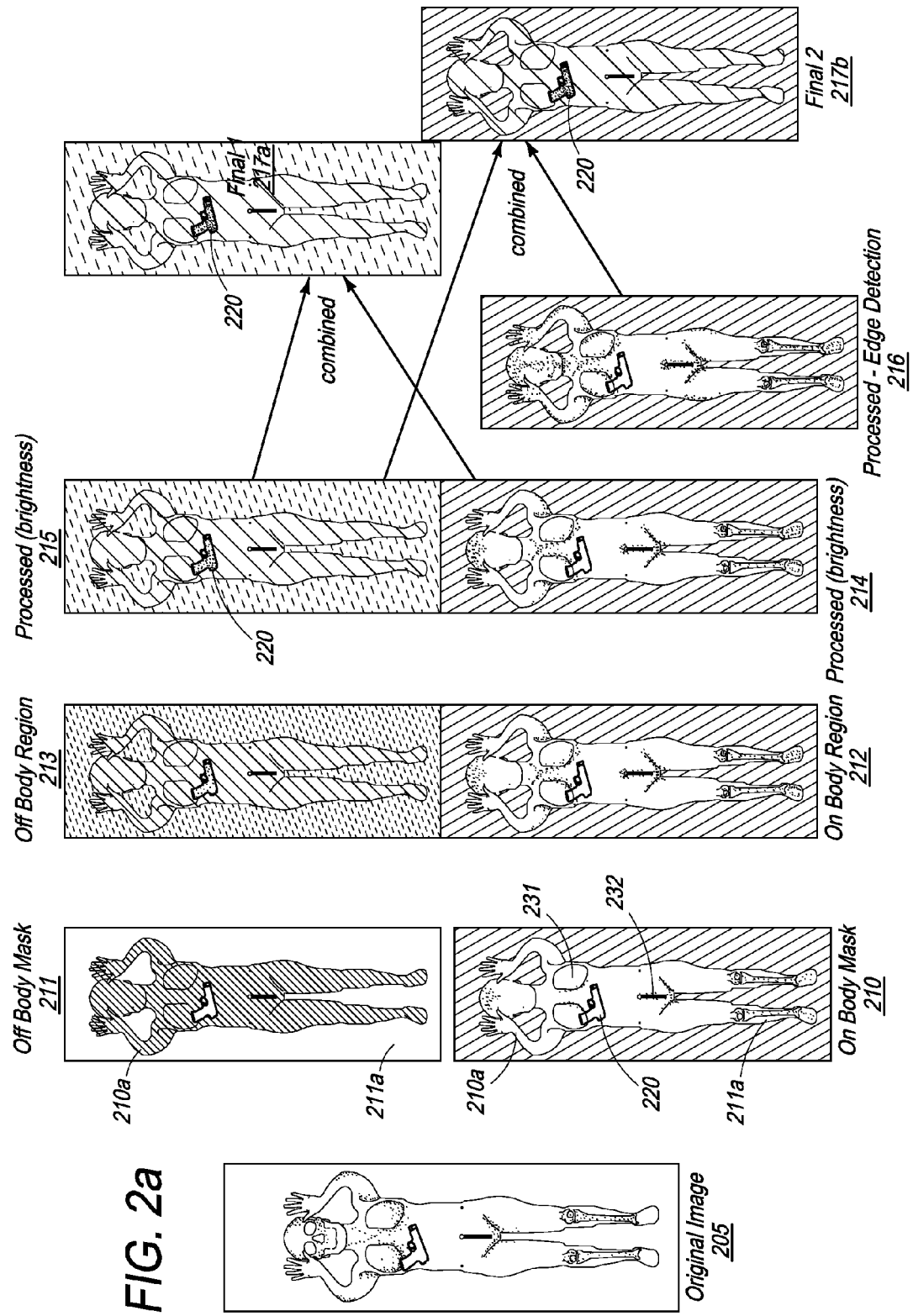
FIG. 2a is a general schematic diagram of the processing techniques of the present invention.

Referring now to FIG. 2a, in one embodiment and not limited to such embodiment, an original image 205 obtained from scanning a human subject may be separated into at least two images 210, 211 or "masks" comprising different regions of interest, where the region of interest represents at least a portion of the original image. In one embodiment, the identification and separation of a region of interest is achieved based on at least one intensity threshold. Thus, the different regions of information contained within the original image are defined by whether the intensity value of that particular region of the image is above, below, or equal to the threshold value. In another embodiment, the threshold value is selected so that it divides regions of information into two categories— lesser scatter and greater scatter. Lesser scatter, in one embodiment, corresponds to scatter from a background barrier or from a high-atomic number object that exhibits reduced scatter. Greater scatter, in one embodiment, may correspond to scatter from a person's body, clothing, or other low-atomic number objects.

In one embodiment, first mask image 210 comprises a portion of the original image 205 that represents the human body 210a while second mask image 211 comprises all other regions in the original image 205 (including background), or "off-body" regions 211a. Thus, in first mask image 210, off-body regions 211a are suppressed while in second image 211, human body regions 210a are suppressed. In another embodiment, original image 205 can be separated into a plurality of regions of interest to create subsequent images with differing regions of information. In another embodiment, the delineated regions of interest are contiguous among the plurality of mask images created to form the total original image. In another embodiment, the delineated regions of interest are discrete.

As shown in first mask image 210, threat object 220 appears on the human body 210a, as do anatomical details 231, 232. In one embodiment, first mask image 210 is processed using privacy algorithms intended to obscure anatomical details 231, 232 while allowing detection of threat objects 220. In one embodiment, threat object 220 is a low-Z material threat object, such as contraband or dangerous weapons/materials. The resultant processed first image 212 retains the information showing threat item 220 located on or near the human body 210a while retaining privacy.

In another embodiment, processed first image 212 is further processed to enhance the brightness of the on-body image, resulting in processed image 214. In another embodiment, where privacy issues may not be of concern, first mask image 210, comprising on-body regions, is untouched or unprocessed, while second mask image 211 is processed to enhance background images. Thus, it should be noted that according to the methods of the present invention, any region can be viewed and/or used in final image creation without secondary processing.

In one embodiment, the second mask image 211, which comprises regions of information containing lesser scatter, retains the original image information and is not processed, resulting in an unprocessed second image (not shown). However, additional threat items may be present in the background that may have been suppressed in processed first image 212 or not processed in second mask image 211. Thus, in another embodiment, the present invention is directed towards enhancing the background of the original image by processing second mask image 211, which contains all off-body information, resulting in processed image 213. Among other benefits, an enhanced background will enhance the visibility of objects on or near the periphery of the subject. In one embodiment, the second mask image 211 is processed using contrast and/or intensity enhancement techniques to elucidate details that may otherwise be obscured.

Second mask image 211 which comprises "off body" regions, however, may also contain threat objects. For example, in some situations, the human being screened may be wearing loose-fitted or baggy clothing or even a jacket. In this situation, a threat object may not be located in front of or on the body, but rather somewhere "off body" and thus, showing as hanging in the air, in which the contrast is extremely low. Thus, by applying an intensified contrast processing algorithm to processed image 213, these otherwise hidden threat objects 220 become more visible (and thus can be imaged), as shown in resultant second processed image 215. Since the intensity processing algorithm is only applied to "off body" areas, privacy concerns are not violated.

In one embodiment, the resultant processed and enhanced images 214, 215 may be viewed separately. In another embodiment, the resultant processed images 214, 215 are combined to create one image 217a, comprising varying levels of information, clearly showing threat 220, and blurring anatomical detail 231, 232.

In one embodiment, the at least one processed image may be further processed to include edge detection contours that highlight darker, contrasting items in the mask image, as shown in image 216. Thus, in another embodiment, a high contrast or thresholded image is used as a stencil in combination with an edge detected image. It should be noted that, in one embodiment, a "thresholded" mask image is a processed version of the original image subject to a threshold calculation. Thus, in this embodiment, the mask image or stencil, processed from the original image, is overlaid onto an edge detect image, also processed from the original image, and combined to form a single image. The mask image is adjusted so that the original data content from low contrast objects on the body and in background areas near the body is displayed. Thus, there is no loss of information in these low contrast areas.

In this embodiment, edge detection contours result from the use of common edge detection methods, which are well-known to those of ordinary skill in the art. The principle of edge detection is used to determine the amount of deviation in the pixel values. Specifically, edge detection is used to view the region around each sampled pixel of the "mask image" to determine the deviation. A large deviation is indicative of an edge, whereas substantial homogeneity is indicative of the lack of an edge. Similarly, the direction of maximum deviation is orthogonal to the direction of the edge. Conventional edge detection contour algorithms include the "Sobel Operator", which is described on page 488 in "Digital Image Processing", William K. Pratt, John Wiley, and Sons (1978), the text of which is herein incorporated by reference in its entirety.

For example, if an item of interest is located on the side of a human subject or in the periphery of the frame of the subject, it will appear as dark and blend in with a conventional low-Z background screen. In U.S. Pat. No. 7,110,493, assigned to the Applicant of the present invention and herein incorporated by reference, discloses "[a] method for detecting concealed items on or in an object, the method comprising: producing a pencil beam of x-rays from an x-ray source directed toward said object; scanning said beam of x-rays over the surface of said object; and detecting x-rays scattered from said beam of x-rays as a result of interacting with said object and a low Z material panel, said object located between said detector and said panel, said detecting comprising differentiating x-rays back scattered by the object from those back scattered by the low Z material panel, wherein said pencil beam of x-rays exposes said object to an x-ray dose in the range of about 1 microrem to about 10 microrem."

The signal resulting from the low-Z material panel ensures a minimum signal level surrounding the subject, when the beam is off or away from the subject, such that inorganic objects on the periphery appear darker than the minimum signal threshold, and are thus present on the resultant overlaid image.

In one embodiment, resultant processed images 215, 216 may be viewed separately, showing individual threat 220. In another embodiment, the resultant processed images 215, 216 are combined to create one image 217b with varying levels of information and enhanced edge contours, showing threat 220 and blurring anatomical details 231, 232.

Several processing techniques are employed in the methods of the present invention. Many of the processing techniques are well-known to those of ordinary skill in the art. For example, numerous techniques for image processing are described in "A Comparison of Image Enhancement Techniques for Explosive Detection", by Maneesha Singh and Sameer Singh, icpr, pp. 811-814, 17$^{th}$ Annual Conference on Pattern Recognition (ICPR'04)—Volume 4, 2004, which is herein incorporated by reference in its entirety. In addition, Muthukkumarasamy, et al have described "Intelligent Illicit Object Detection System for Enhanced Aviation Security", in 2004, published at The School of Information Technology in Griffith University, Australia, which is also herein incorporated by reference in its entirety.

Privacy algorithms are described in "Privacy algorithm for cylindrical holographic weapons surveillance system" by Keller et al. in *Aerospace and Electronics Systems Magazine*, 15, pp. 17-24, February 2000, herein incorporated by reference. In addition, Cai et al describe "Feature hiding in 3D human body scans", in *Information Visualization* (2006) 5, pp. 271-278, and in particular, a privacy algorithm that detects human private parts in a 3D scan data set, which is herein incorporated by reference in its entirety.

Further, additional publications, such as "Image processing tools for the enhancement of concealed weapon detection", by Slamani et al in *Proceedings of the International Conference on Image Processing*, 3, pp. 518-522, IEEE, (Kobe, Japan), October 1999 describe general image processing techniques and is herein incorporated by reference in its entirety. Still further, "Defect Identification and Classification for Digital X-Ray Images" by Yin et al in *Applied Mechanics and Materials*, Vols. 10-12 (2008) pp. 543-547, describes digital image processing techniques in a broad spectrum of fields, and is herein incorporated by reference in its entirety.

It should be noted, however, that the algorithms and image processing techniques described in the publications above are exemplary and not to be construed as limiting the present invention.

Reference will now be made to specific embodiments of the present invention. The embodiments described herein are not to be taken as a general disavowal of any one specific embodiment or used to limit the claims beyond the meaning of the terms used therein.

In one embodiment, but not limited to such embodiment, the present invention is directed towards systems and methods for screening individuals at security locations while preserving the privacy of individuals and retaining the efficiency of the screening process. The systems and methods of the present invention allow for maximum threat detection performance with minimum display of anatomical details. In another embodiment, the present invention is directed towards systems and methods for screening individuals that do not require an operator to view an actual image of the subject's body to obtain an indication of objects desired to be detected. In another embodiment, the present invention is directed towards systems and methods of screening individuals at security locations employing an image processing technique that allows for different regions of an original image to be processed separately so that different portions of the image can be optimized to desired object detection or privacy levels.

An exemplary detection system employed in the present invention is a concealed object detection system in which a pencil beam of X-rays is scanned over the surface of the body of a person under inspection or examination. In other embodiments, however, the radiographic image can be formed using any available radiation imaging technique for "body imaging" such as, but not limited to X-ray scattering, infrared imaging, millimeter wave imaging, RF imaging, radar imaging, holographic imaging, CT imaging, and MRI. Any "body imaging" system, as is known to those of ordinary skill in the art, that has the potential for displaying body detail may be employed. The image processing methods of the present invention ensure that the inspection occurs with minimal invasion of privacy. While the present invention is described with respect to its use in a concealed object detection system in which a pencil beam of X-rays is scanned over the surface of the body of a person under inspection or examination, the present invention is not limited to such use and the description provided herein is intended to be exemplary.

X-rays that are scattered or reflected from the subject's body, that result from the pencil beam of X-rays scanned over the surface of the body, are detected by a detector such as, for example, a scintillator and photomultiplier tube combination. The signal produced by this scattered X-ray detector is then used to produce an image representation of the subject and any concealed objects carried by the subject. The system allows the operator to detect threats by imaging explosive materials such as dynamite and C-4, as well as ceramics, graphite fibers, plastic containers, plastic weapons, glass vials, syringes, packaged narcotics, bundled paper currency, and even wooden objects.

The present invention, however, does not require the operator to view an actual image of the subject's body to obtain an indication of potential objects desired to be detected. Instead, as described above, the image processing technique of the present invention allows for different regions of an original image to be processed separately so that different portions of the image can be optimized to desired object detection or privacy levels.

In one embodiment, the present invention is a walk-through, concealed object detection system that utilizes low-level radiation doses to detect weapons and dangerous materials, regardless of whether they consist of metal or low-Z materials. The system is configured to include a left side module and a right side module separated by a distance sufficiently wide to allow a person to walk between the two modules. A housing, which may include a ceiling, conceals the left side module and the right side module, forming a portal configuration. This configuration can accommodate a high throughput of people as compared to the prior art because each person being screened simply walks, or is moved, such as by a moving walkway, through the portal, and does not need to stop and turn his or her body as directed by a scanner system operator. In addition, the portal configuration of the preferred embodiment, with its relatively confined area, is easier to combine with other walk-through devices, including metal detectors, drug and explosives sniffers, and video cameras.

The X-ray backscatter imaging system used for the image processing methods of the present invention can be used in conjunction with other security devices as described above, as a standalone device, or as a built-in system that forms, for example, a doorway into a room of a building. The system, employed in any of these configurations, may be operated as a covert scanning system so that a person who is not aware of the scanning process cannot take countermeasures to defeat the system. There are many security systems that are currently being used that, similarly, do not alert persons of their existence. For example, security cameras and infrared beams may covertly record and track the movements of individuals. Covert scanning is particularly useful for screening officials and dignitaries who cannot be overtly searched for diplomatic reasons.

U.S. Pat. No. 5,181,234, assigned to Rapiscan Security Products, Inc., the applicant of the present invention, discloses an X-ray imaging apparatus for detecting a low atomic number object carried by or on a human body positioned at a distance from said apparatus comprising: x-ray source for producing a pencil beam of X-rays directed toward said human body; scanning means for moving the region of intersection of said pencil beam and said human body over the surface of said human body in a scanning cycle, said scanning cycle being sufficiently short to expose said human body to a low radiation dose; a detector assembly providing a signal representative of the intensity of the X-rays scattered from said human body as a result of being scanned by said scanning means, said detector assembly being disposed on a same side of said human body as said X-ray source and having an active area with dimensions sufficient to receive a substantial portion of said scattered X-rays to provide a coefficient of variation of less than 10 percent in said signal; and display means to presenting characteristics of the detector signal to an operator; wherein said scattered X-rays are distributed across said detector to create an edge effect which enhances edges of said low atomic number object to enable detection. The contents of this patent are herein incorporated by reference in their entirety.

U.S. Pat. No. 6,094,472, also assigned to Rapiscan Security Products, Inc. and herein incorporated by reference, describes an X-ray imaging apparatus for detecting an object carried by or on a body moving relative to the apparatus, said apparatus having an entrance and an exit, said apparatus comprising: a passageway extending at least from said entrance to said exit; at least one X-ray source having means for producing a pencil beam of X-rays directed toward said body in said passageway, said pencil beam intersecting said body at a region of intersection corresponding to a pixel having a pixel value; a scanning means disposed adjacent said at least one X-ray source for moving the region of intersection of said pencil beam and said body over a surface of said body; a tracking means for causing the scanning means to substantially track said body as it moves with respect to said apparatus from said entrance to said exit; a detector assembly for detecting an intensity of X-rays scattered from said body as a result of being scanned by said first scanning means and for generating a signal representative of the intensity of the scattered X-rays, said detector assembly comprising a plurality of detectors; and display means for presenting characteristics of the detector signal to an operator.

Figure 2B:
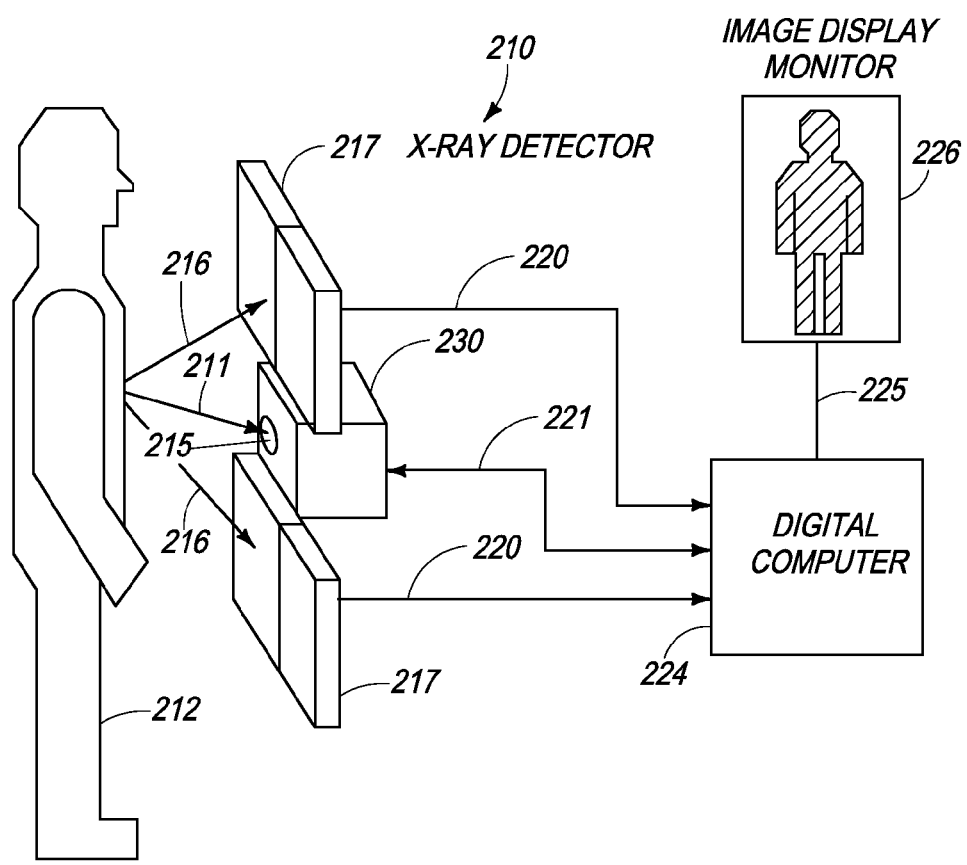
FIG. 2b is a schematic diagram of one embodiment of a backscatter detection system used in the methods of the present invention.

FIG. 2b is a schematic diagram of the backscatter detection system used in one embodiment of the secure imaging system and image processing methods of the present invention. As shown in FIG. 2b, the imaging system 210 provides a pencil beam of X-rays 211 directed at the body 212 of the person under inspection or examination. Details of the mechanical system for generating the sweeping pencil beam of X-rays are known the in the art and will not be described herein.

Referring back to FIG. 2b, the pencil beam of X-rays 211 is scanned in a horizontal motion across the body under inspection 212. Scattered or reflected X-rays 216 that are scattered or reflected from body under inspection 212 are detected by X-ray sensitive detectors 217 positioned laterally opposite and facing the subject, and on the same side as the X-ray pencil beam source 230. In one embodiment, detector panels 217 are located in the same plane as the X-ray source 230, but above and below the X-ray source 230. X-ray detectors 217 are positioned for substantially uniform X-ray detection on all sides of the incident X-ray beam. The electronic signal 220 produced from the X-ray detectors 217 and synchronization signals 221 received from the X-ray pencil beam source 230 are routed into digital computer 224.

Digital computer 224 generates an image display 225 on a monitor 226, wherein the intensity at each point in the display corresponds to the relative intensity of the detected scattered X-rays. In another embodiment, digital computer 224 generates at least two processed images from at least two rendered mask versions of the original image. In another embodiment, at least two processed images are combined to arrive at a single image which is presented as an image display 225 on a monitor 226.

Predetermined density and area threat features are employed to determine the presence of a potential prohibited object. The system is created as "intelligent" in that it is trained to dismiss a small snap button as a threat, but alerts upon presence of a knife. Therefore, with the use of detection algorithms, the presence of metallic objects is established by first comparing the shading information and then the area, density and size information of the object detected, with a set of existing known objects including a gun, a key-ring or a button, but not limited to such examples of known objects.

Optionally, in yet another embodiment, the more detailed display of additional body areas may be achieved based on a predetermined set of rules (requiring no supervisor approval). Optionally, only portions of the image will be presented with additional detail.

As explained above, a computer system with automatic detection algorithms or a manual operator is employed for identifying regions of interest that need to be separately processed to yield detailed images.

Figure 3:
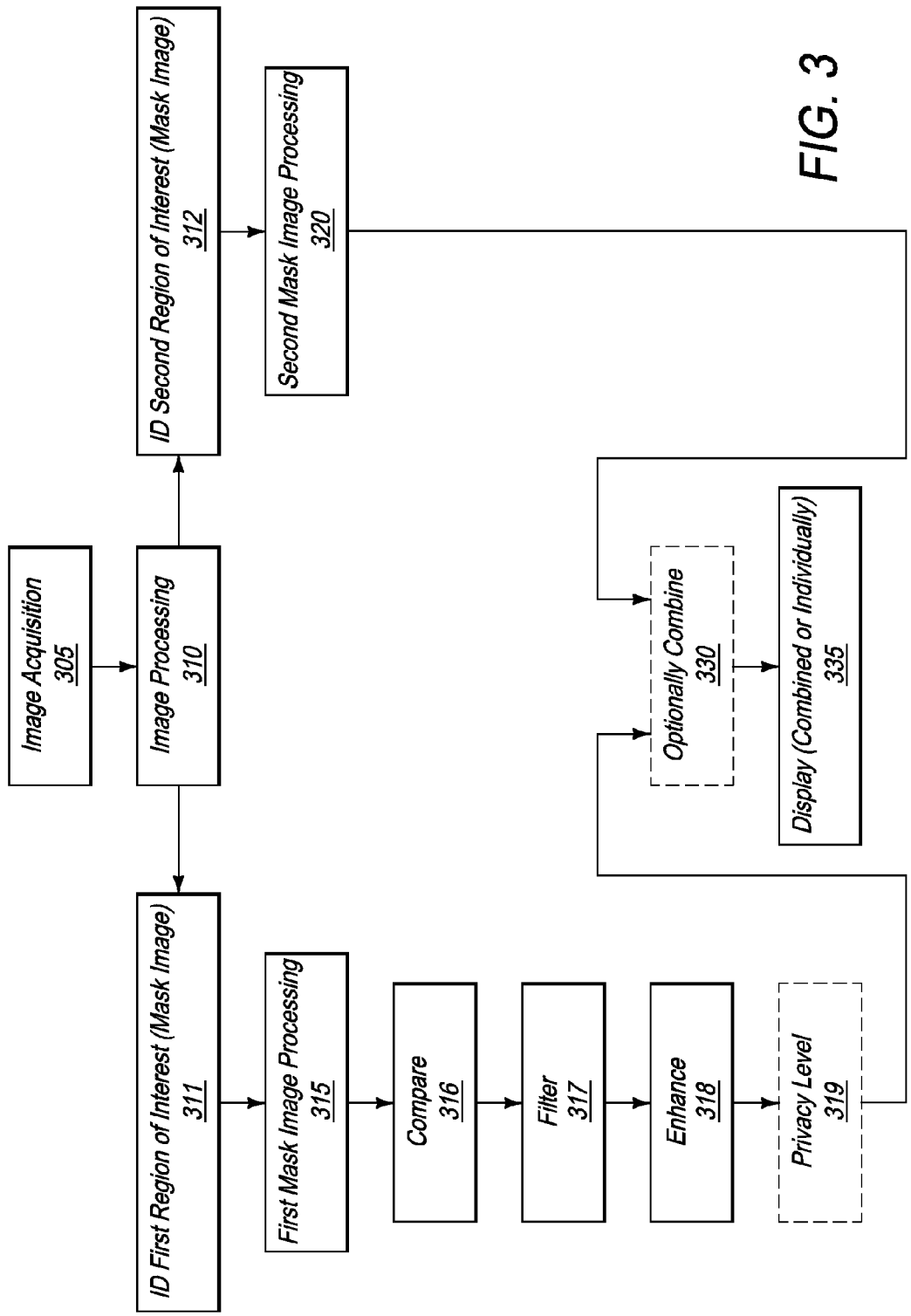
FIG. 3 is a flowchart describing exemplary operational steps according to one embodiment of the processing methods of the present invention, as used in a security screening system.

FIG. 3 is a flowchart describing exemplary operational steps according to one embodiment of the image processing methods of the present invention, as used in a security screening system. Reference will also be made to FIG. 2a where appropriate. Operationally, to initiate the image processing techniques of the present invention, a subject is first scanned 305 to obtain a digital image representation, shown as 205 in FIG. 2a. The original image acquired by the screening system (as described in FIG. 2b) is then processed 310 by a computer system, as explained above, to implement the image processing methods of the present invention.

In one embodiment, the original image is processed 310 to form at least two different mask images, each of which contains a different region of interest. In one embodiment, the at least two different mask images further comprise a first mask image that results from identifying and separating 311 out at least a first region of the original image and a second mask image that results from identifying and separating 312 out at least a second region of the original image. The first mask image preferably comprises the outline of the human subject. The second mask image preferably comprises the background of the image, or all "off-body" areas.

In one embodiment, the identification and separation of at least a region of the original image is achieved based on at least one intensity threshold. Thus, the different regions of information contained within the original image are defined by whether the intensity value of that particular region of the image is above, below, or equal to the threshold value. In another embodiment, the threshold value is selected so that it divides regions of information into two categories—lesser scatter and greater scatter. Lesser scatter, in one embodiment, corresponds to scatter from a background barrier or from a high-atomic number object that exhibits reduced scatter. Greater scatter, in one embodiment, may correspond to scatter from a person's body, clothing, or other low-atomic number objects.

In another embodiment, the at least two different mask images are processed separately to create at least two corresponding processed region images. In one embodiment, the processed region images comprise images that contain different levels of detail derived from regions of information on the original image. Embodiments of the present invention are also directed towards image processing techniques that allow for effective detection of both organic and inorganic objects/items located both on a human subject and "off body" with considerations for desired levels of privacy and/or optimized levels of detection per region of interest. The present invention contemplates several methods of creating individually processed images, which in one embodiment, are derived from mask images, which can be viewed individually or superimposed on one another to form one image. In addition, it should be understood to those of ordinary skill in the art that any number of settings and/or algorithms may be used to manipulate or alter the original image, mask image or resultant overlay image which may affect the outcome of the final image.

In one embodiment, the first mask image is processed 315 using intensity-based image contrasting to create a processed first image. The data defining individual pixels of the first image derived from the original image is subjected to, in the present invention, contrasting and thresholding (subjecting to a threshold calculation) for the dual purpose of improving the contrast of threat items while washing out the anatomical details of the subject to arrive at a first mask image of the original image.

The key features in the high contrast image are then compared 316 with a stored library containing previously obtained human images. This library of human images is used to identify common anatomical features in the present subject so those anatomical features can be suppressed. The library may also contain within its images certain common benign objects which can also be suppressed to permit more accurate detection of dangerous or illegal concealed objects.

In one optional embodiment, blocks of image pixels identified as a private human anatomy (by virtue of feature comparison with human images in the library) are subject to smoothing filters 317 that tend to blur the internal details of the anatomical block of pixels. In an alternate embodiment, blocks of sampled pixel values showing substantial homogeneity may be subject to smoothing filters.

Once the identified blocks or regions of pixels are smoothed, thus resulting in blurred anatomical contours, the smoothed pixels are further subject to an enhancement of brightness 318. This achieves a further washing out or blurring of body contours in addition to highlighting metallic or inorganic threats that generally remain as comparatively darker regions or pixel blocks in the image matrix. In one optional embodiment, the operator can select 319 the level of privacy for the image displayed by modifying the brightness.

In one embodiment, the second mask image is processed 320 using contrast/intensity enhancement techniques to elucidate details that may otherwise be obscured. The second mask image comprises "off body" regions may also contain threat objects. For example, in some situations, the human subject being screened may be wearing loose-fitted or baggy clothing or even a jacket. In this situation, the threat object may not be located in front of or on the body, but rather somewhere "off body" (due to its location on the subject's clothing) and thus, showing as hanging in the air, in which the contrast is extremely low. Thus, by applying an intensifying processing algorithm to this portion, these otherwise hidden objects become more visible and can be imaged. Since the intensity processing algorithm is only applied to "off body" areas, privacy concerns are not violated.

The processed first and second images are optionally combined 330, resulting in a single image with different areas of contrast to show detailed information and still retain privacy. The individual or combined images are then displayed 335.

FIGS. 4a, 4b, and 4c are illustrations of processed X-ray images at low 401, medium 403, and high 405 privacy settings, respectively, according to one embodiment of the personnel screening system of the present invention. Initially, an organic and/or inorganic/metallic threat 410 on the body of the subject under screening 415 may not be well-defined or distinct relative to its immediate background (which in this case would be the body of the subject) in the original image. For example, the threat/contraband boundaries may be poorly delineated, and the original image may have significant anatomical features 420 visible, by virtue of contrast between the pixels resulting from varying pixel intensities, and that may have privacy implications with reference to the human subject being screened.

The smooth and brightened image of the human subject, resulting from the original image and hereinafter referred to as a processed first image, when used in conjunction with a processed second image, highlights darker contrasting threat items in conjunction with edge contours. Edge contours are achieved by using techniques of edge detection and enhancement, as is well-known to those of ordinary skill in the art. The principle of edge detection is used to determine the amount of deviation in the pixel values. Specifically, edge detection is used to view the region around each sampled pixel of the "mask image" to determine the deviation. A large deviation is indicative of an edge, whereas substantial homogeneity is indicative of the lack of an edge. Similarly, the direction of maximum deviation is orthogonal to the direction of the edge.

Figure 1A:
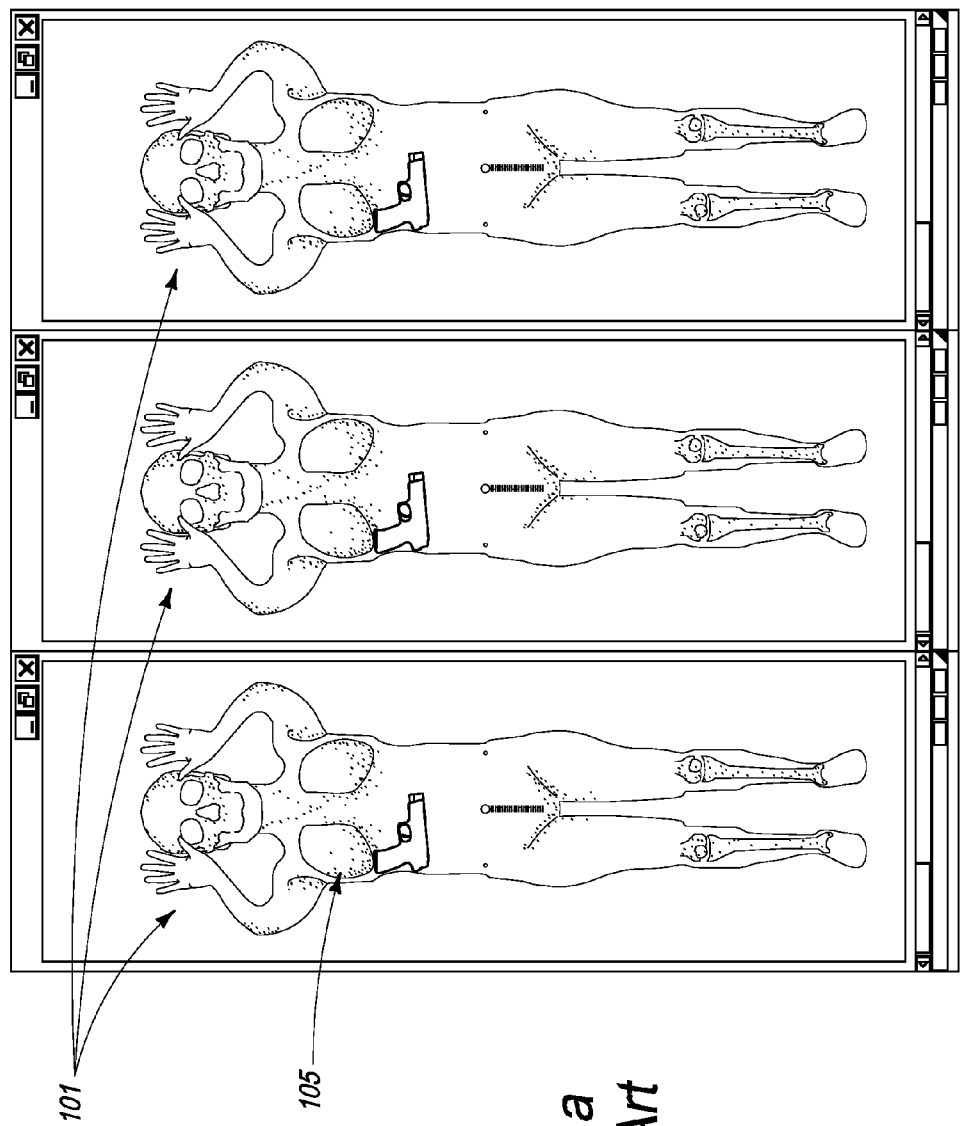
FIGS. 1a, 1b, and 1c is a prior art illustration of X-ray images generated from a conventional personnel screening system, where anatomical details are evident, at low, medium, and high privacy settings, respectively.
Figure 1B:
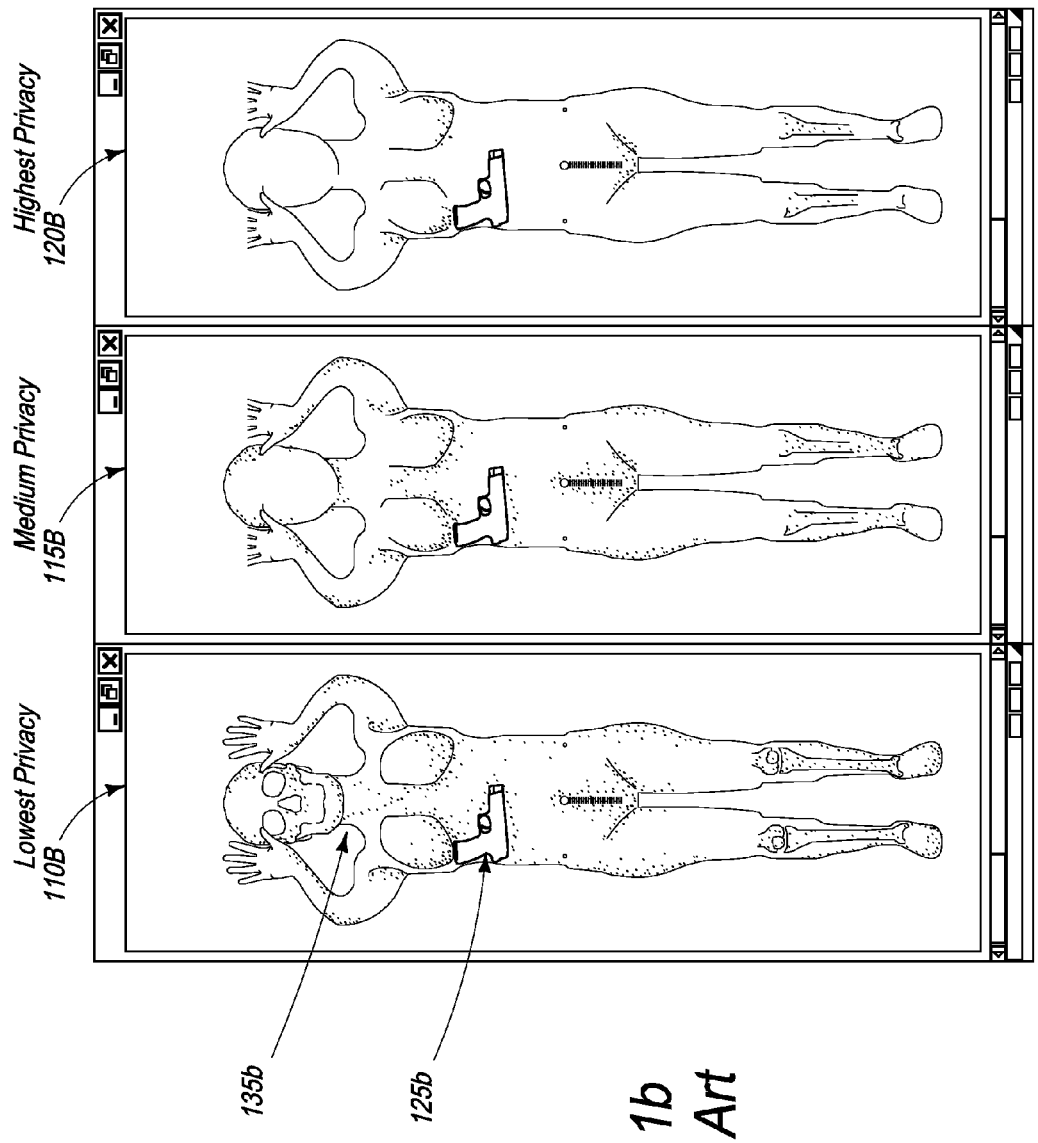
Figure 1C:
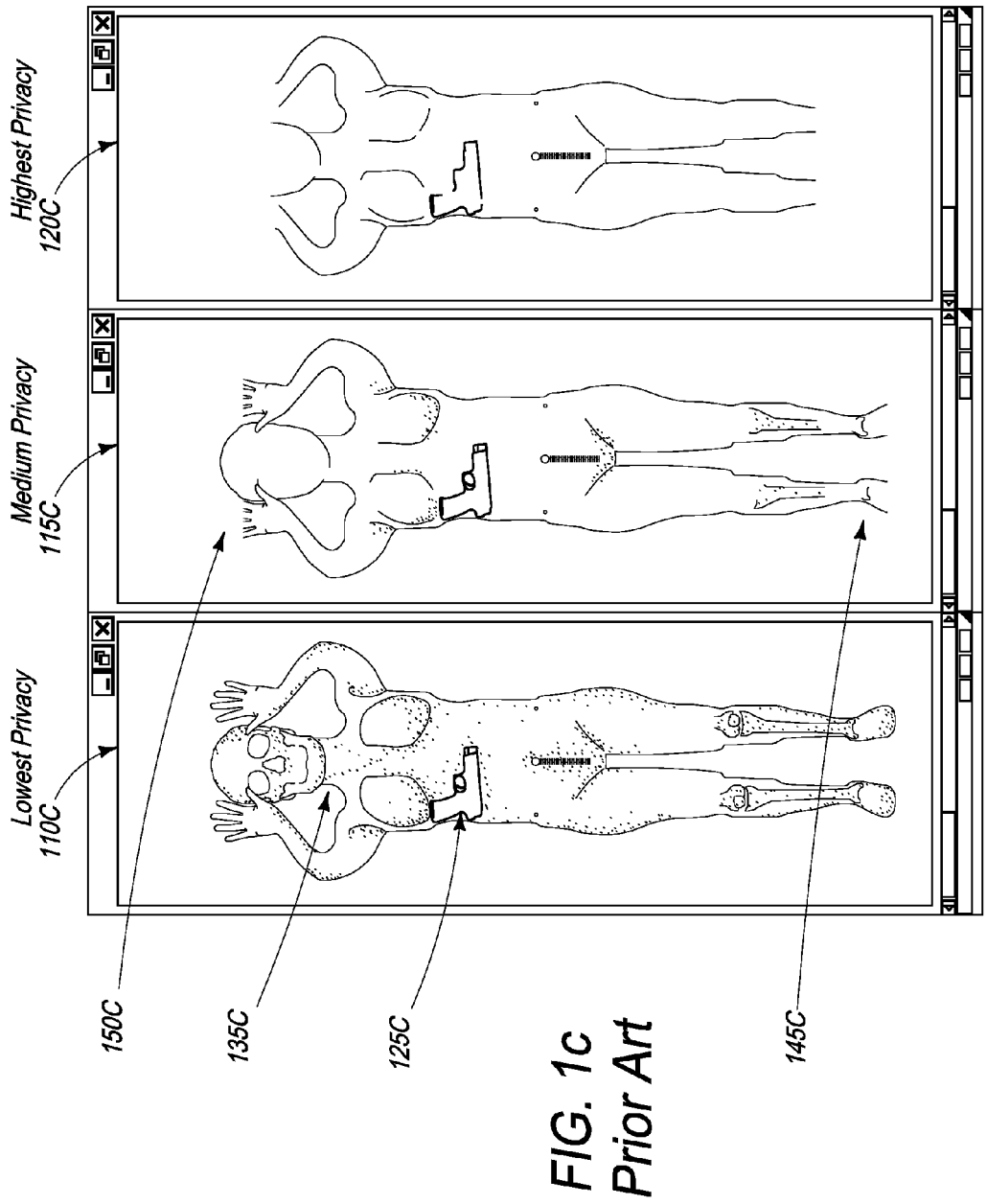

Because of the image processing methods of the present invention that allows for regions of information within the image to be processed separately, the resultant image provides a sufficient amount of detail compared to prior art systems. For example, as shown in FIGS. 4a-4c, the details of the extremities, and more specifically, hands 430 and feet 435, still remain in the image. Referring back to FIG. 1c, the image processing techniques tend to blur out details such as fingers and feet. Threat items are thus better delineated without compromising the privacy of the human being screened.

Figures 5A, 5B, 5C:
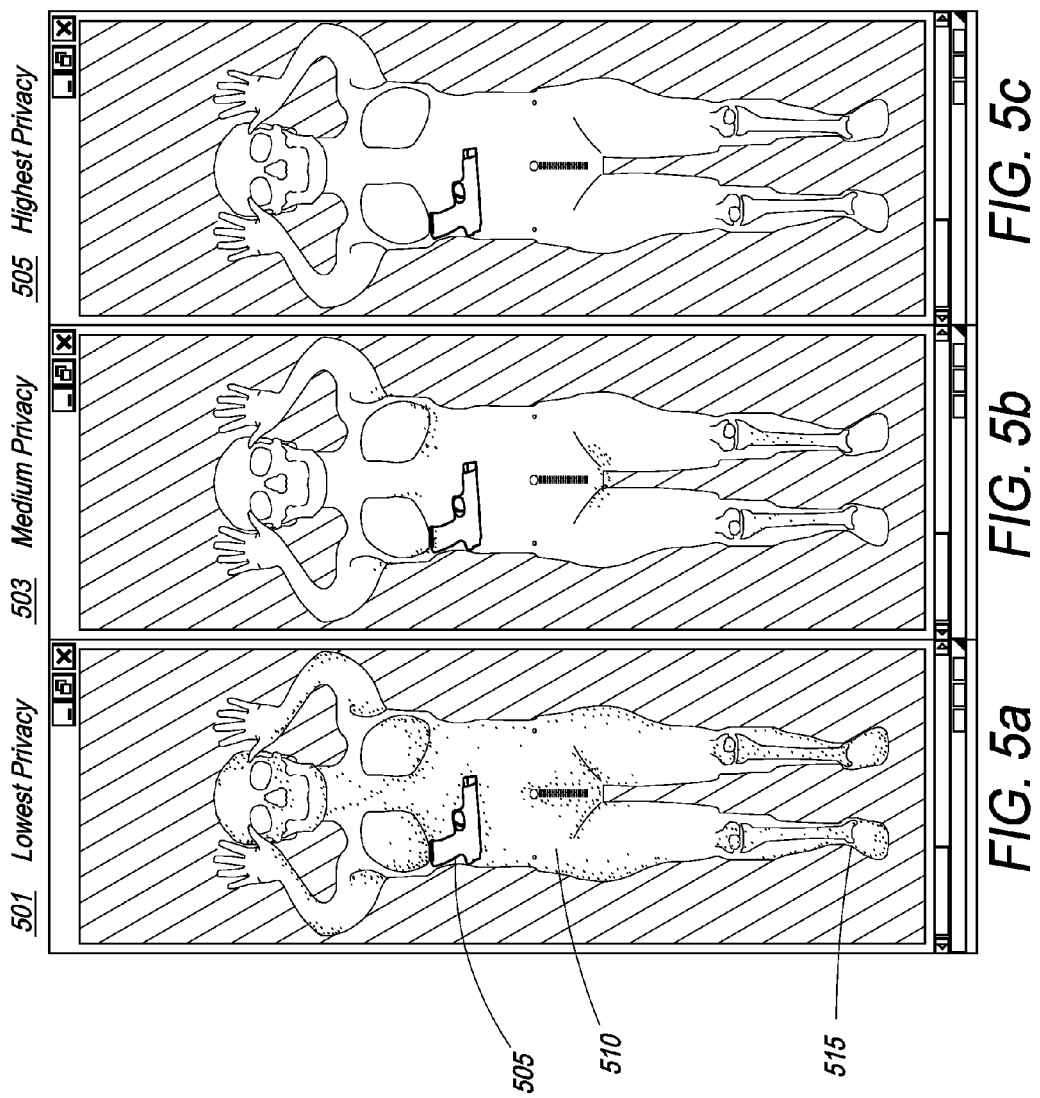
FIGS. 5a, 5b, and 5c are illustrations of processed X-ray images at low, medium, and high settings, respectively, according to another embodiment of the processing methods of the present invention, as used in a security screening system.

Referring now to FIGS. 5a, 5b, and 5c processed X-ray images are shown, at low 501, medium 503, and high 505 privacy settings, respectively, according to another embodiment of the present invention. The smoothed and brightened first image, resulting from the separated region of interest mask image, and thus, the original image, is used as a stencil so that it can be overlaid or superimposed on an edge detect image, also resulting from the original image.

Thus, in this embodiment, a first mask image derived from at least a portion of the original image is processed to develop the background image which has already been described with respect to the embodiment above. A second mask image derived from the original image is separately processed to create an edge detect image, as described above. The smoothed and brightened first background image is then superimposed over the edge-detected image second image, such that it will allow the original data content of low contrast objects 505 on the body and in the background areas away from the body to be displayed without loss of information. For example, as shown in FIGS. 5a, 5b, and 5c, the subtle details are kept intact, especially with respect to the location of inorganic objects (such as the gun detail 505) and in the perimeter of the body of the subject (such as the hair 510 and pant legs 515, which are now visible). Thus, the first mask image is processed to elucidate minimal detail from the body, while the resultant second mask image is processed to retain much of the background information.

FIGS. 6a, 6b, and 6c are illustrations of processed X-ray images at low privacy settings 601, medium privacy settings 603, and high privacy settings 605, respectively, according to one embodiment of the screening system of the present invention. In this particular embodiment, as described above, a first mask "on-body" image is created and optionally processed, the background of the original image is enhanced, and the two images are then superimposed upon one another, resulting in the final image. Among other benefits, an enhanced background will enhance the visibility of objects 605 on or near the periphery of the subject. More specifically, if an item of interest 605 is located on the side of a human subject 610 or in the periphery of the frame of the subject 615, it will appear as dark and blend in with a conventional low-Z background screen 620.

Applications of the system of present invention include, but are not limited to screening of passengers at airports and railway stations, at shopping malls and for medical purposes. In shopping malls, where there are substantial chances of theft the scanning system of the present invention could be employed to check for precious articles such as jewelry. For instance, the bodies of persons may be scanned to detect concealed diamonds. In such a case, it is known that any diamond particles in or on the person's body will absorb a greater proportion of the incident X-ray radiation than the surrounding body tissue or bone. Thus the diamonds will cause an increase in relative attenuation of the X-ray signal and this will be visibly discernible in the final image produced.

In other applications, the human body could be scanned for the presence of broken bones or other physiological irregularities during medical examinations. Although specific reference has been made to a subject being in standing position during a scanning procedure, horizontal scanning is equally possible with the person lying down on a table.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. A method for generating and processing an image comprising the steps of: subjecting a person to an X-ray source; detecting X-ray radiation; generating an original image, having a plurality of regions wherein each region has an associated scatter intensity, from said detected X-ray radiation; using a processor, identifying in said original image a first region having a first scatter intensity and a second region having a second scatter intensity by comparing the scatter intensity of each of said plurality of regions to a threshold value, wherein the first scatter intensity is greater than the second scatter intensity; creating a first region image from the first region and a second region image from the second region wherein the second region image is representative of off-body areas of the original image; and individually processing the first region image and the second region image to create a first processed region image and a second processed region image.

2. The method of claim 1 further comprising the step of combining the first processed region image and second processed region image to create a combined image.

3. The method of claim 1 wherein the original image generated is that of said person combined with a background.

4. The method of claim 3 wherein the first region image is representative of the person without said background.

5. The method of claim 1 wherein the first region image and second region image are created by applying an empirical determination derived from a library of knowledge.

6. The method of claim 1 wherein the first region image and second region image are created by employing object recognition techniques.

7. The method of claim 1 wherein the first region image is processed to create a first processed region image that maintains object of interest information and reduced anatomical detail of the person.

8. The method of claim 7 wherein the first processed region image is a representation of at least a region of the original image that is processed using intensity-based image contrasting.

9. The method of claim 8 wherein the first processed region image is a representation of at least a region of the original image that is processed using edge detection algorithms.

10. The method of claim 1 wherein the image processing method is employed to detect concealed contraband and dangerous objects.

11. A method for processing images in an X-ray backscatter imaging system for inspecting a human body comprising: subjecting said body to backscatter radiation; detecting said radiation; producing data derived from the detection of said radiation; generating an original image from said data wherein said original image is of said body combined with a background, wherein said original image has a plurality of regions and wherein each region has an associated intensity; using a processor, identifying in said original image a first region having a first intensity and a second region having a second intensity by comparing the intensity of each of said plurality of regions to a threshold value, wherein the first intensity is greater than the second intensity; creating a first region image from the first region and a second region image from the second region; and individually processing the first region image and second region image to create a first processed region image and a second processed region image wherein the second processed region image is representative of said background.

12. The method of claim 11 wherein the first region image is representative of said body without said background.

13. The method of claim 11 wherein the first processed region image and second processed region image are combined to create a final image.

14. The method of claim 11 wherein the first region image and second region image are created by applying an empirical determination derived from a library of knowledge.

15. The method of claim 11 wherein the first region image and second region image are created by employing object recognition techniques.

16. The method of claim 11 wherein the first region image is processed to create a first processed region image that maintains object of interest information and reduced anatomical detail of the person.

17. The method of claim 11 wherein the first processed region image is a representation of at least a region of the original image that is processed using intensity-based image contrasting.

* * * * *